United States Patent [19]
Stewart

[11] Patent Number: 5,982,276
[45] Date of Patent: Nov. 9, 1999

[54] MAGNETIC FIELD BASED POWER TRANSMISSION LINE COMMUNICATION METHOD AND SYSTEM

[75] Inventor: William L. Stewart, Dallas, Tex.

[73] Assignee: Media Fusion Corp., Dallas, Tex.

[21] Appl. No.: 09/074,107

[22] Filed: May 7, 1998

[51] Int. Cl.$^6$ ................................................. H04M 11/04
[52] U.S. Cl. .............................. 340/310.01; 340/310.03; 340/310.07; 455/402
[58] Field of Search ......................... 340/310.01, 310.03, 340/310.07; 333/17.1, 124; 455/402, 41

[56] References Cited

U.S. PATENT DOCUMENTS

| | | | |
|---|---|---|---|
| 4,471,399 | 9/1984 | Udren | 340/310.01 |
| 5,554,968 | 9/1996 | Lee | 340/310.01 |
| 5,559,377 | 9/1996 | Abraham | 307/104 |
| 5,670,931 | 9/1997 | Besser et al. | 340/310.01 |
| 5,684,450 | 11/1997 | Brown | 340/310.02 |
| 5,886,619 | 3/1999 | Takasan et al. | 340/310.01 |

*Primary Examiner*—Daniel J. Wu
*Attorney, Agent, or Firm*—Bryan Cave LLP

[57] ABSTRACT

A method and system for communicating information between subscribers over power transmission lines which normally convey electrical power to a plurality of diverse electrical sites for providing electrical power to electrical devices disposed at these diverse electrical sites. The subscribers on the communication network are located at these electrical sites. The electrical power conveyed over the power transmission lines is in the form of electromagnetic radiation which has an electrical field component and an associated magnetic field component. The information, such as telephonic voice communication or other data, is transmitted in the magnetic field component of the electromagnetic radiation carried over the power transmission line, such as by exciting the field with a MASER, in order to enable communication between the subscribers at the various electrical sites. The MASER provides an inverted atomic population by pumping directly, through a Q-switch and a synthetic aperture lens, into the atomic population of the electromagnetic wave carried over the power transmission line to produce acoustic wave oscillation at the appropriate atomic transition frequency. The MASER output is transmitted within the existing magnetic flux envelope created by the magnetic field of the electromagnetic radiation carried over the power transmission line and the power transmission line acts as a magnetic waveguide for the coherent magnetic frame emissions from the MASER. Inductive coupling is used to receive the transmitted information.

46 Claims, 9 Drawing Sheets

MAGNETIC FIELD BASED POWER TRANSMISSION LINE COMMUNICATION METHOD AND SYSTEM

BACKGROUND OF THE INVENTION

1. Field of the Invention

The present invention relates to a method and system for utilizing a power transmission network as a communication network along with its normal power transmission function, and, particularly to such a network in which the magnetic field component of the electromagnetic radiation traveling along the power transmission line through a power distribution network is utilized to transmit information between subscribers, including telephonic voice communication.

2. Background Art

The use of power transmission lines as a communication media is well known in the art with some of the earliest work dating back to the 1930's in an effort to provide telephone communication to rural areas which had not yet been served by telephone lines, such as the type of prior art systems described in U.S. Pat. Nos. 2,032,360; 2,264,395; and 2,264, 396. These systems, which employed carrier waves superposed on the electrical component of the electromagnetic radiation carried over the power transmission line, were strictly analog in nature and were not particularly successful because of the inherent limitations of the analog bandwidth, signal attenuation, and the inability to handle more than one call at a time. As further attempts were made to develop an analog based system, it was discovered that unsatisfactory radiation from the power transmission line would result at carrier frequencies in excess of 300 KHz which would interfere with long wave radio signals, limiting such systems to a frequency range of 30 KHz to 300 KHz. One such attempt at developing an analog based system, described in U.S. Pat. No. 5,684,450, permitted the use of carrier frequencies greater than 1 MHz for transmission between power transformers, however, it was found that electromagnetic noise from the power lines interfered with the information signals being transmitted, such as each time an electrical appliance connected to the power distribution network was switched on. The need to transmit information through the power transformers also proved an impediment to a successful power line communication system. Attempts have also been made to overcome these problems through the use of digital signal transmission instead of an analog carrier wave, but still utilizing the electrical component of the electromagnetic radiation carried over the power transmission line, such as disclosed in U.S. Pat. Nos. 5,554,968; 5,559,377; and 4,471,399, as well as the use of digital packets to try to overcome the noise problem, but these attempts have also been unsatisfactory and/or too costly.

Because of the well established power transmission infrastructure, and the increasing need for higher speed, higher capacity, and greater distribution of information of all types over great distances, particularly telephonic communications today, there is a continuing and increasing need to develop a satisfactory and cost effective communication system which takes advantage of the vast and well established power transmission line distribution network already in place throughout the United States and the world at large. The disadvantages of the prior art are overcome by the present invention which utilizes the magnetic field component of the electromagnetic radiation carried over the power transmission lines rather than the electric field component which the prior art has concentrated on.

SUMMARY OF THE INVENTION

The present invention comprises a method and system for communicating information between subscribers over power transmission lines which normally convey electrical power to a plurality of diverse electrical sites for providing electrical power to electrical devices disposed at these diverse electrical sites. The subscribers on the communication network are located at these electrical sites. The electrical power conveyed over the power transmission lines is in the form of electromagnetic radiation which has an electrical field component and an orthogonal and interdependent or associated magnetic field component. The information, such as telephonic voice communication or other data, is transmitted in the magnetic field component of the electromagnetic radiation carried over the power transmission line, such as by exciting the field with a MASER, in order to enable communication between the subscribers at the various electrical sites. The system enables selective reception of the transmitted communication using standard information protocol addressing. The signal transmitted from the MASER, which employs a microwave generator, is a coherent acoustic type signal which has an output frequency which is sufficient to cause atomic transition from E1 to E2 within the magnetic field of continua around the power transmission line at the specific magnetic moment that exists as a result of the electricity flowing through the power transmission line, such as in the range of 30 GHz to 300 GHz. The MASER provides an inverted atomic population by pumping directly, through a Q-switch and a synthetic aperture lens, into the atomic population of the electromagnetic wave carried over the power transmission line to produce acoustic wave oscillation at the appropriate atomic transition frequency. The MASER output is transmitted within the existing magnetic flux envelope created by the magnetic field of the electromagnetic radiation carried over the power transmission line and the power transmission line acts as a magnetic waveguide for the coherent magnetic frame emissions from the MASER. Inductive coupling is used to receive the transmitted information and detects and converts the electromagnetic field into electrical signals for analysis, verification, and distribution to the designated subscriber or subscribers in accordance with the information protocol. The signal processing of the information is accomplished through a neural network such as a reduced coulomb energy network or RCE and conventional fuzzy tools. The system may selectively route and process messages and control event management for the various electromechanical devices connected to the power line. The transmitted signal is transparent to the power transformers, can be transmitted over great distances, at high speed, without suffering any significant signal attenuation, is relatively unaffected by noise, and has no affect on external long wave radio communications. In this regard, MASER amplifiers, such as employed in the present invention, can provide noise figures in the microwave and radio frequency ranges that are lower than those for any other electronic type of amplifiers at the same frequencies.

DETAILED DESCRIPTION OF THE PREFERRED EMBODIMENT

Figure 1:
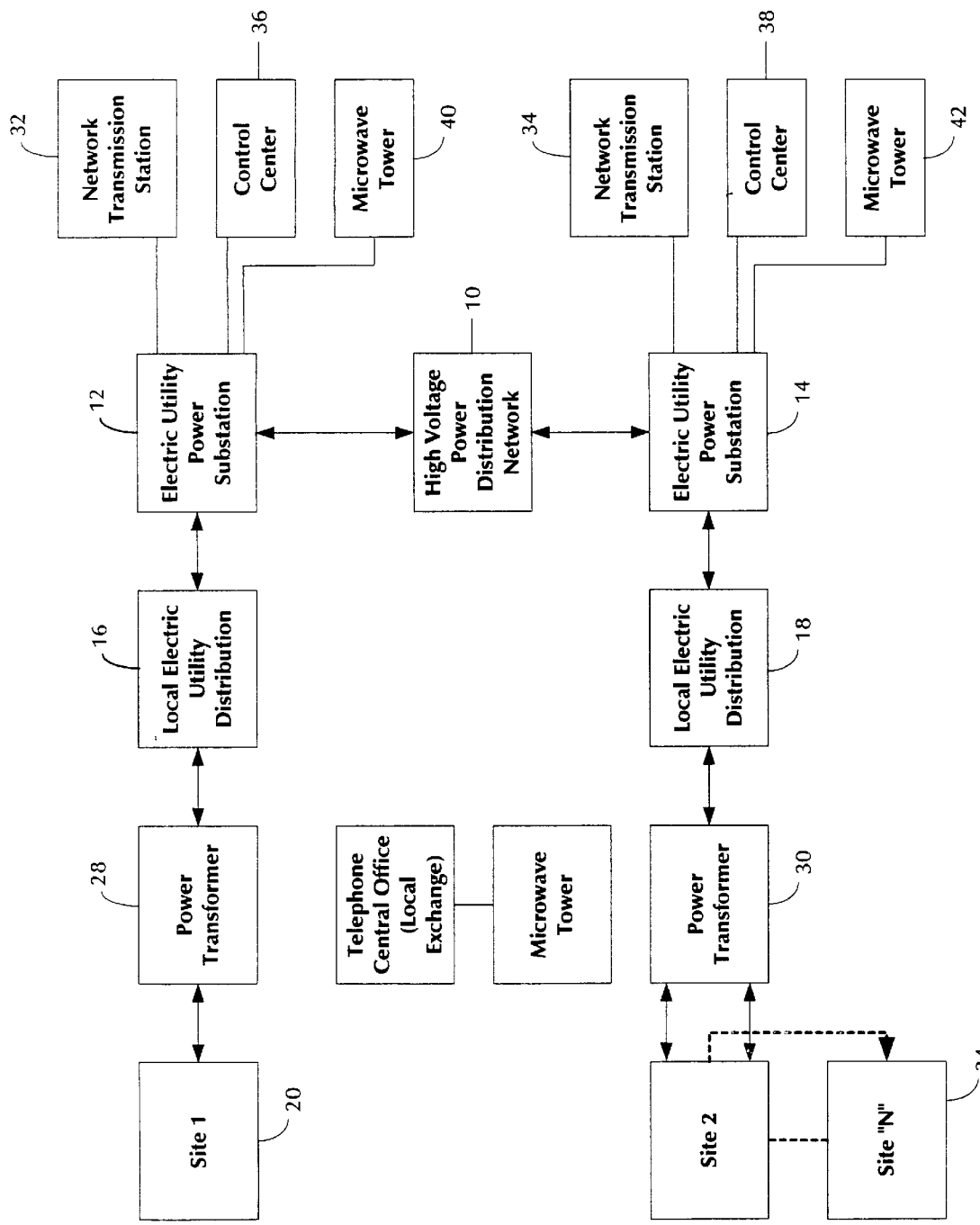
FIG. 1 is a diagrammatic illustration of the presently preferred system of the present invention capable of carrying out the presently preferred method of the present invention.

Referring now to the drawings in detail, and initially to FIG. 1, a presently preferred system for communicating information, such as telephonic voice communication or other data communication, over the conventional electric power distribution network is shown. As shown by way of illustration in FIG. 1, the conventional power distribution network used for distributing electrical power nationally includes a conventional high voltage power distribution network 10 which contains high voltage power transmission lines, conventional electric utility power substations 12,14, with two such typical substations being illustrated in FIG. 1, conventional local electric utility power distribution 16, 18 for distributing the power from the high voltage power distribution network 10 to the local subscribers or users at diverse electrical locations represented by sites 1 through N, 20,22,24, via power transmission lines 26 (FIG. 2) and conventional power transformers 28, 30. Up to this point, the system is a conventional power distribution network for transmitting electricity in the form of electromagnetic waves carried over the power transmission lines throughout the power distribution network. As is well known, electromagnetic radiation emanates from any wire in which a varying current flows and power transmission lines are no exception. The current traveling through the power transmission line 26 sets up magnetic and electric fields which are interdependent or associated with each other, with a change in one always being accompanied by a change in the other. This relationship is defined by Maxwell's equations. As will be explained in greater detail hereinafter, the presently preferred method and system of the present invention take advantage of the magnetic field component of the electromagnetic radiation carried over the power transmission lines 26 and use it as the transmission carrier for the information signals to be transmitted between subscribers in the communication network of the present invention.

In this regard, the system of the present invention further includes a network transmission station 32,34 for transmitting information through the magnetic flux envelope created by the magnetic field component of the electromagnetic wave carried by the power transmission line 26, as will be explained in greater detail hereinafter with reference to FIGS. 2–9, a control center 36,38 for controlling the reception and transmission of information over the power distribution network as will be explained in greater detail hereinafter, and conventional microwave towers 40,42 for transmitting the information at microwave frequencies. The system shown in FIG. 1 also includes, by way of example, a conventional telephone central office 44 and microwave tower 46 for handling conventional telephone communication for the subscriber with other conventional telephone subscribers not connected to the communication network of the present invention. Thus, preferably each of the telephone subscribers to the communication network of the present invention has a conventional telephone handset 48 (FIG. 4) which is connected both to conventional telephone lines for receiving conventional telephone communications and to the power line, via an interface controller 50 (FIG. 4) to be described hereinafter, for enabling reception of telephone communications over the power lines using the system of the present invention. Instead, if desired, two different conventional telephones can be employed, one connected to each type of communication network, or a single telephone with two separate lines, one connected to each network, or any other arrangement within the skill in the art.

Figure 2:
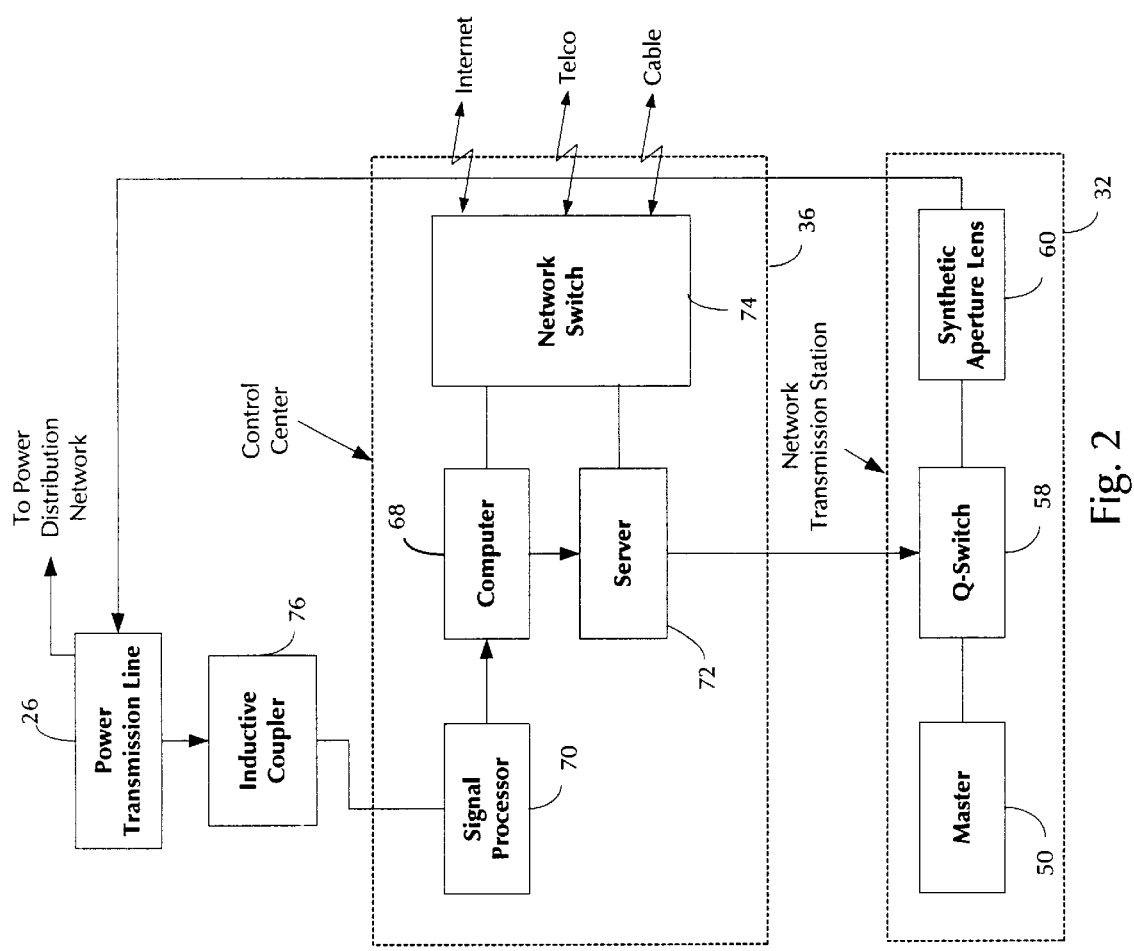
FIG. 2 is a diagrammatic illustration, similar to FIG. 1, of a typical control center for use in the system of FIG. 1.
Figure 3:
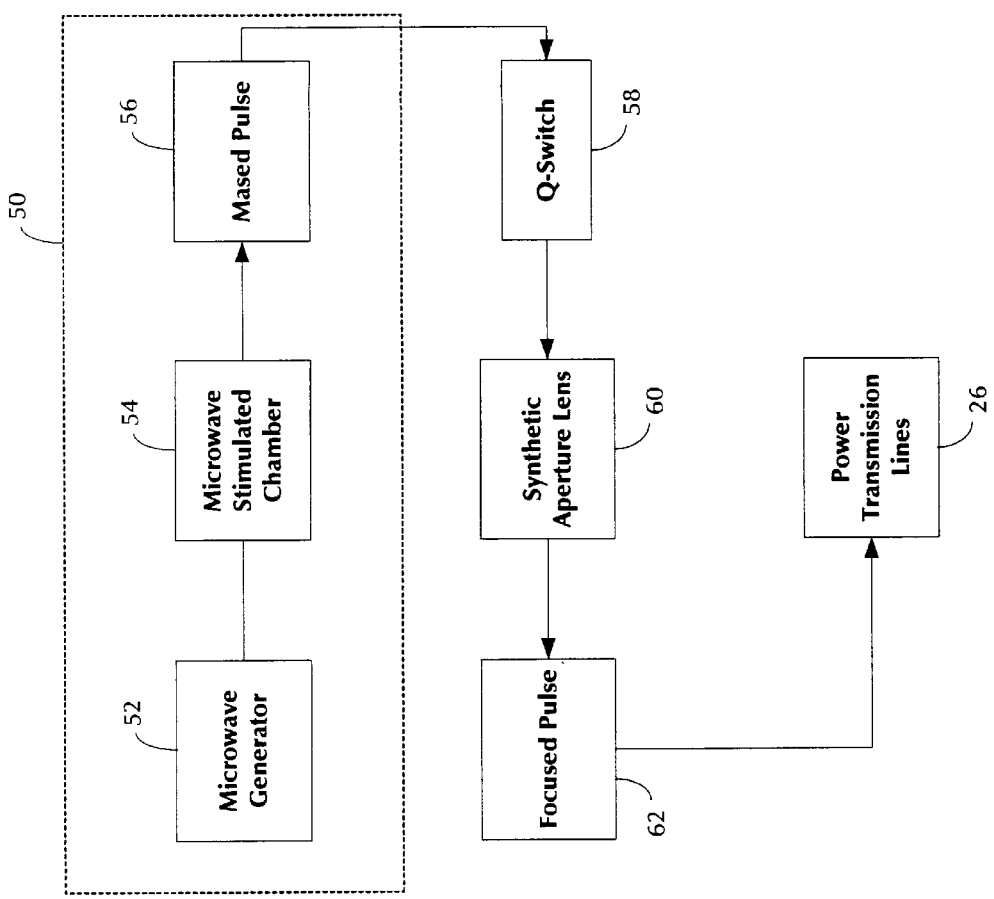
FIG. 3 is a diagrammatic illustration, similar to FIG. 1, of a typical network transmission station for use in the system of FIG. 1.
Figure 4:
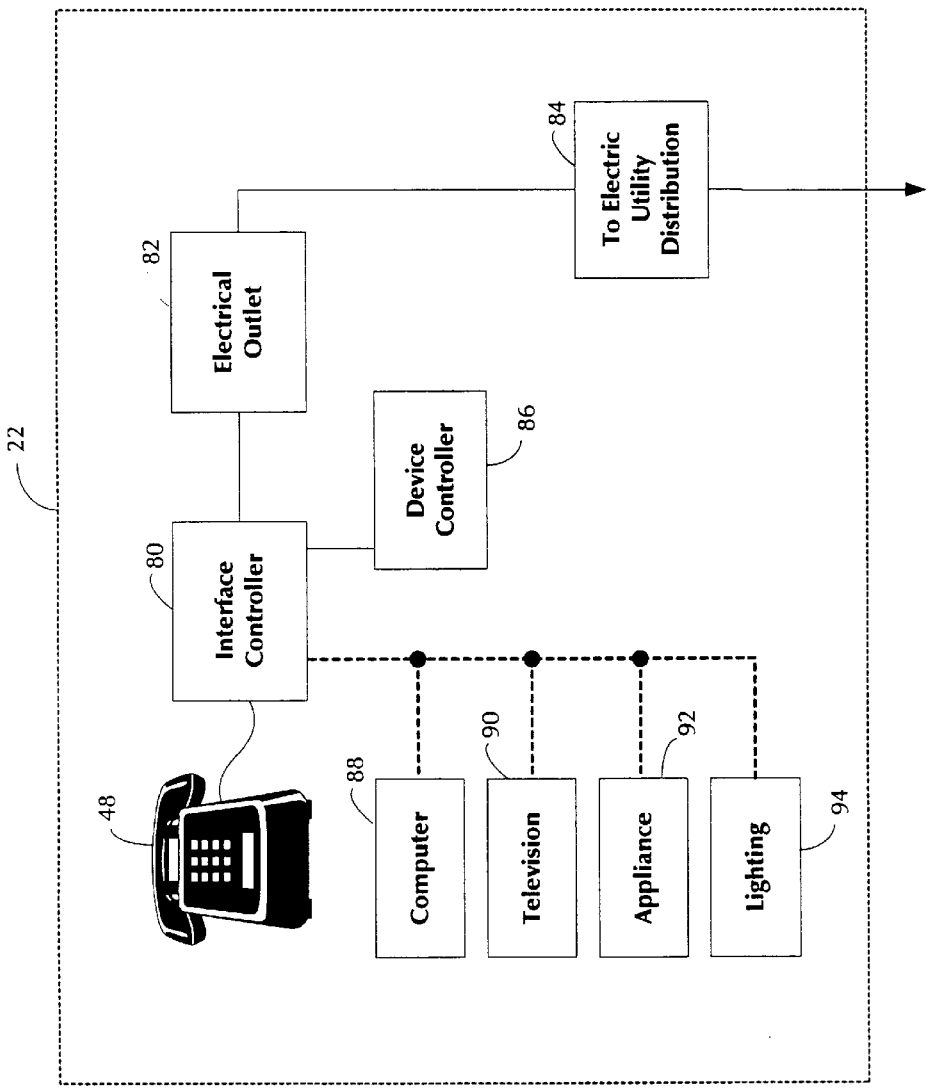
FIG. 4 is a diagrammatic illustration, similar to FIG. 1, of a typical site location for use in the system of FIG. 1.

Referring now to FIGS. 2 and 3, a typical control center 36 and network transmission station 32 shall now be described. As shown and preferred in FIGS. 2 and 3, a conventional MASER 50 is employed to transmit the information in the magnetic field component of the electromagnetic radiation carried over the power transmission line 26. The MASER 50 amplifies microwaves to provide power sufficient to inscribe the information to be transmitted in the magnetic field generated by the electromagnetic wave carried by the power transmission line 26. The MASER 50 conventionally employs a microwave generator 52, and a microwave stimulation chamber 54 to provide a MASED pulse 56. The signal 56 transmitted from the MASER 50 is a coherent acoustic type signal which preferably has an output frequency which is sufficient to cause atomic transition from E1 to E2 within the magnetic field of continua around the power transmission line 26 at the specific magnetic moment that exists as a result of the electricity flowing through the power transmission line 26, such as, by way of example, in the range of 30 GHz to 300 GHz. A discussion of magnetic moments is provided in MECHANICS OF CONTINUA, by Eringen, 1967,1980,1989, published by Krieger Publishing Co. Preferably, the MASER 50 provides an inverted atomic population in the magnetic field surrounding the power transmission line 26 by pumping directly, through a conventional Q-switch 58, such as described in LASERS, by Anthony Siegman, 1986, published by University Science Books, and a conventional synthetic aperture lens 60, into the atomic population of the electromagnetic wave carried over the power transmission line 26 to produce acoustic wave oscillation at the appropriate atomic transition frequency. The synthetic aperture lens 60 is a magnetic lens which is capable of providing a focused pulse 62 which is aimed at the power transmission line 26 to focus the output of the MASER 50 onto the electromagnetic wave carried by the power transmission line 26, and particularly to pump it directly into the magnetic flux envelope 64 (FIG. 9) created by the magnetic frames 66(FIG. 6) resulting from the magnetic field associated with the electromagnetic wave carried by the power transmission line 26. The conventional Q-switch 58 conventionally controls the microwave pulses from the MASER 50 in accordance with the information to be transmitted.

Conventional information protocol or IP addressing is used to correctly route the information to the designated subscribers. In accordance with the system of the present invention, since the line is always "hot", no ringing current need be transmitted to initiate a telephone call. All that need be done, is to use the correct IP protocol to turn on the phones of the designated subscribers for the call, whether a single party private call or a multiparty conference call. The control center 36 may preferably typically include a conventional computer 68, a conventional signal processor 70, a conventional server 72, and a conventional network switch 74. The network switch 74 conventionally switches between various communication sources such as Internet, telephone company, or cable, by way of example. The computer 68 conventionally controls the operation of the Q-switch 58. The computer 68 may be conventionally programmed to select message routing, process messages in conjunction with the signal processor 70, and do event management such as to determine what event has occurred with respect to electromechanical devices connected to the power line; for example, as to whether a light has been turned on or a telephone has gone off hook. The presently preferred signal processing 70 is via a conventional neural network, such as a reduced coulomb network or RCE as described in DARPA NEURAL NETWORK STUDY, Nov. 1988, reprinted Mar. 1990, Oct. 1992, published by AFCEA International Press, using conventional fuzzy tools.

As shown and preferred in FIG. 2, inductive coupling 76 is used to receive the transmitted information from the magnetic field surrounding the power transmission line 26. The inductive coupler 76 is preferably a ferroceramic type of inductive coupler having a sensitivity such as $10^{-23}$ volts. The inductive coupler 76, which is otherwise a conventional type of inductive coupler, preferably detects and converts the transmitted electromagnetic waves into electrical signals which are analyzed by the signal processor 70, verified as to communication content, and distributed to the power lines at the various sites 20, 22, 24 for access by the appropriate designated subscribers via the IP protocol. As shown and preferred in FIG. 4, assuming the communication is a telephonic voice communication for site 22, the telephone at that site 22 is connected to the power line through an addressable interface controller 80 plugged into a conventional electrical outlet 82 which is connected to the power lines via the conventional electric utility distribution network 84. The subscriber 48 may then talk to the caller in normal fashion with the communication being carried out over the power lines instead of the normal telephone lines. The addressable interface controller 80 may preferably include RAM, a passive GPS buffer for locating the subscriber, a passive TDR buffer, and a ROM chip/ASIC, with conventional jacks for plugging in equipment to the network, such as an RJ-11 jack for the telephone and/or video jacks, etc. A conventional device controller 86 may also be employed for conventionally remotely turning on or off appliances or other electrical devices in the home such as computer 88, television 90, appliance 92, or lighting 94. This device control information can also be transmitted over the power lines.

Figure 5:
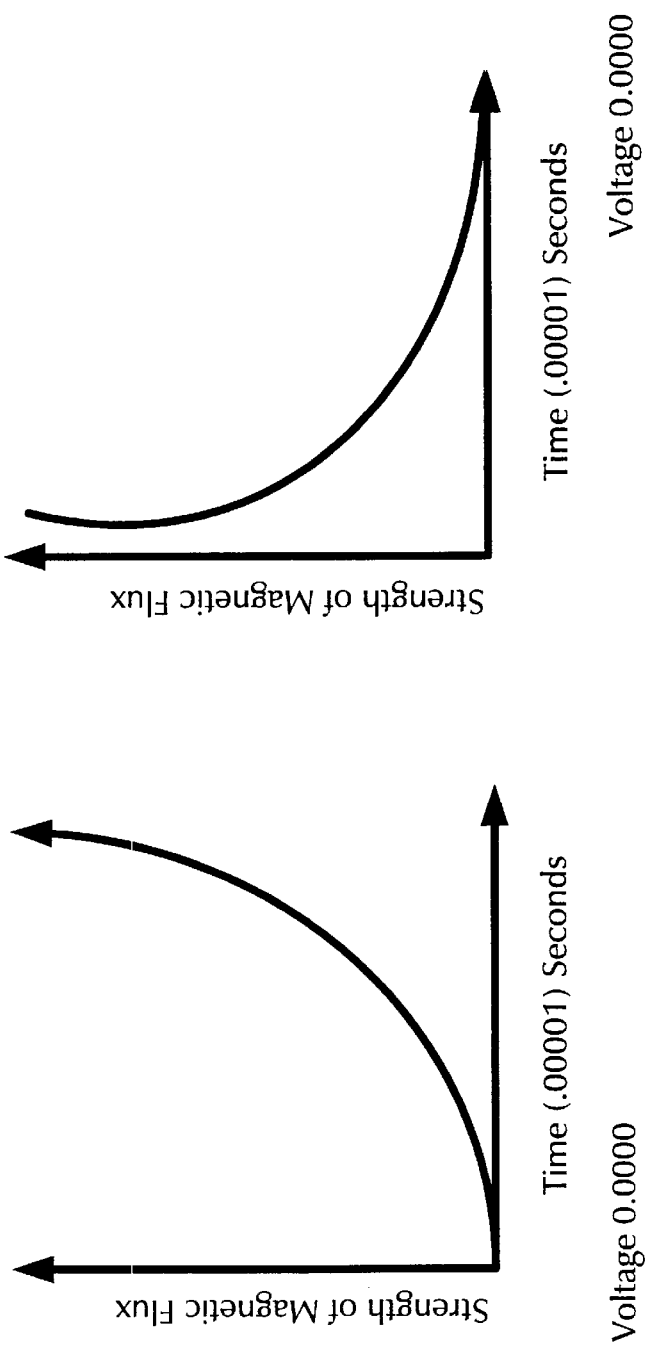
FIG. 5 is graphical illustration of a typical magnetic frame associated with the electromagnetic radiation carried over the power transmission line of the system of FIG. 1.
Figure 6:
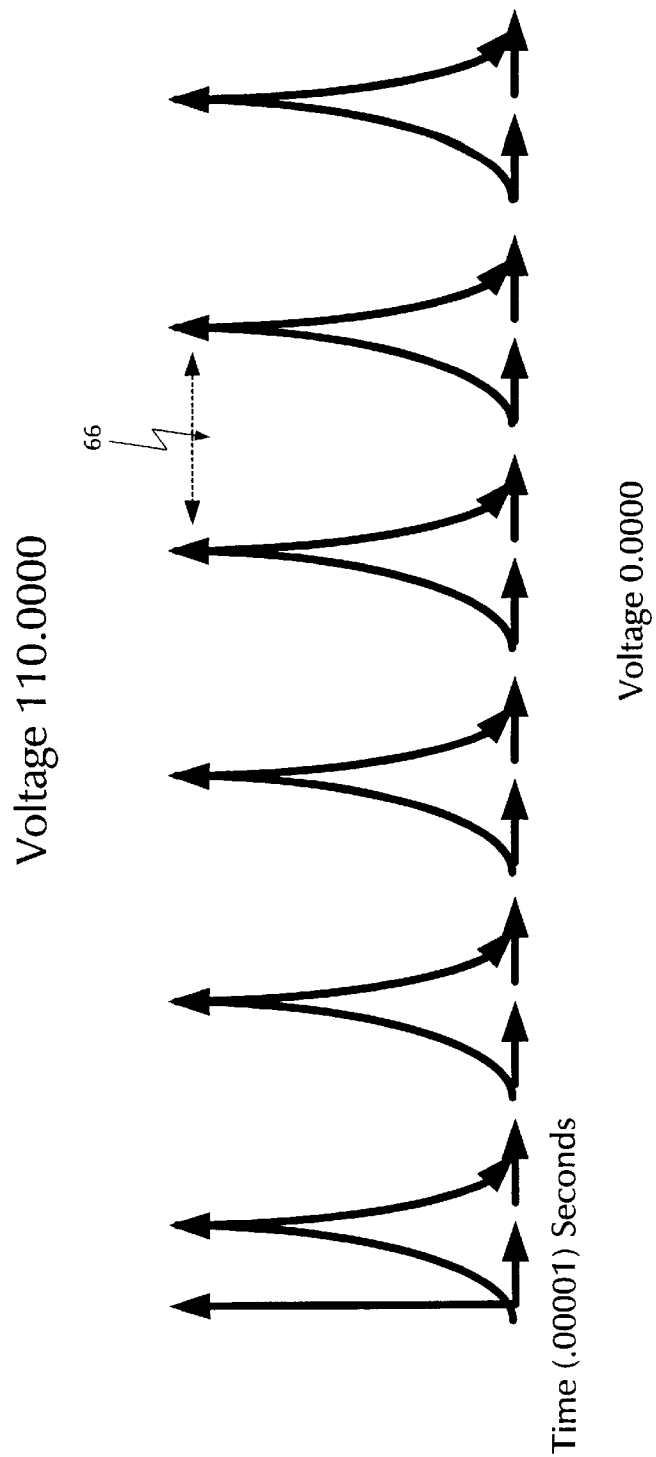
FIG. 6 is a graphical illustration, similar to FIG. 5, of a typical series of magnetic frames associated with a half cycle of the electromagnetic radiation carried over the power transmission line of the system of FIG. 1.
Figure 7:
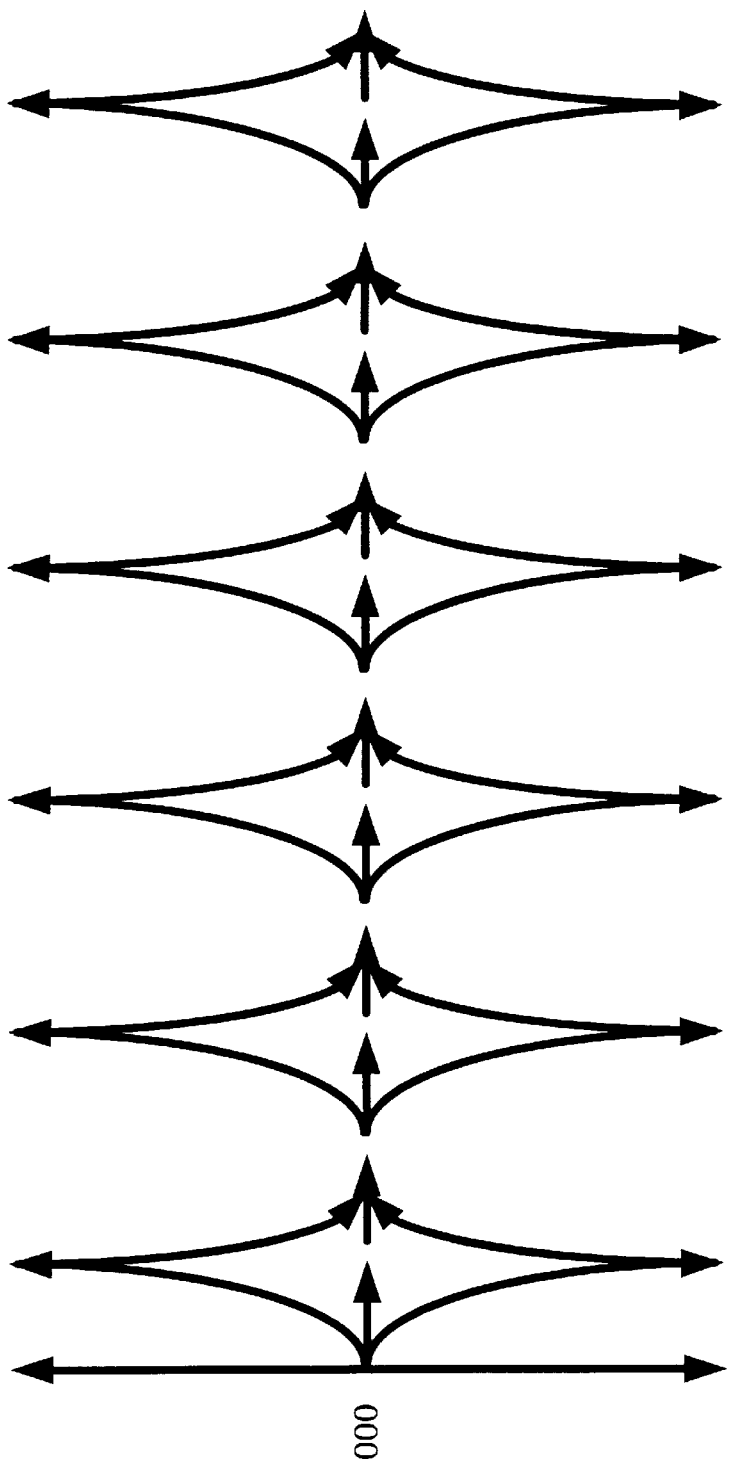
FIG. 7 is a graphical illustration, similar to FIG. 6, illustrating the typical series of magnetic frames for a full cycle of the electromagnetic radiation carried over the power transmission line of the system of FIG. 1.
Figure 8:
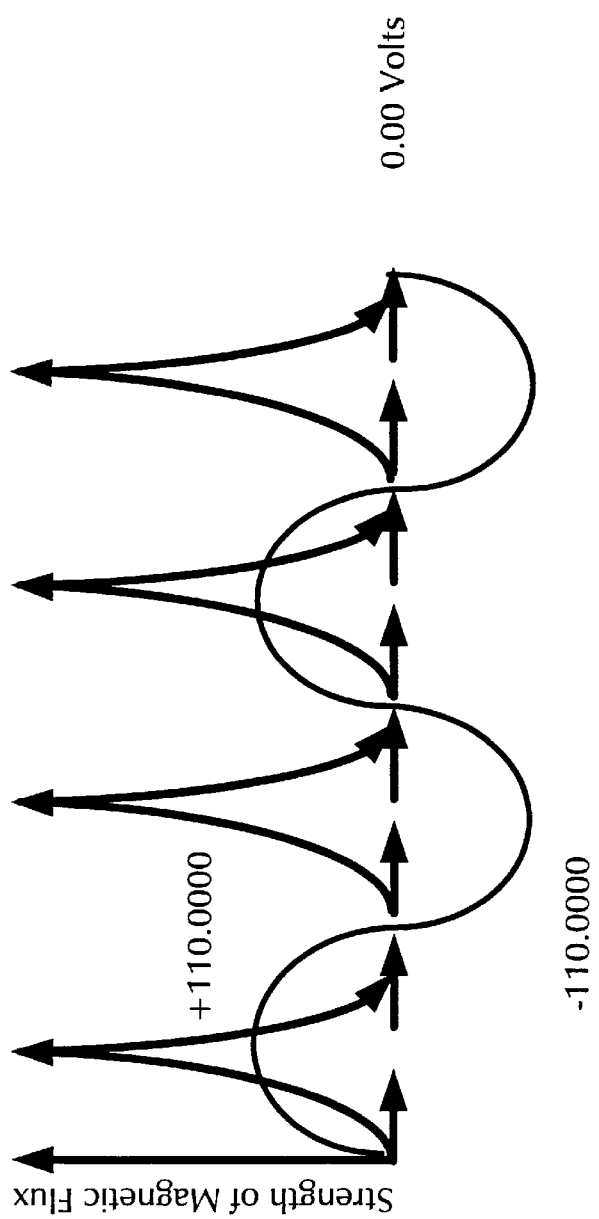
FIG. 8 is a graphical illustration, similar to FIG. 6, of a typical series of magnetic frames associated with a 60 Hz full cycle electromagnetic wave carried over the power transmission line of the system of FIG. 1, with the 60 Hz signal superimposed on a half cycle of the series of magnetic frames.
Figure 9:
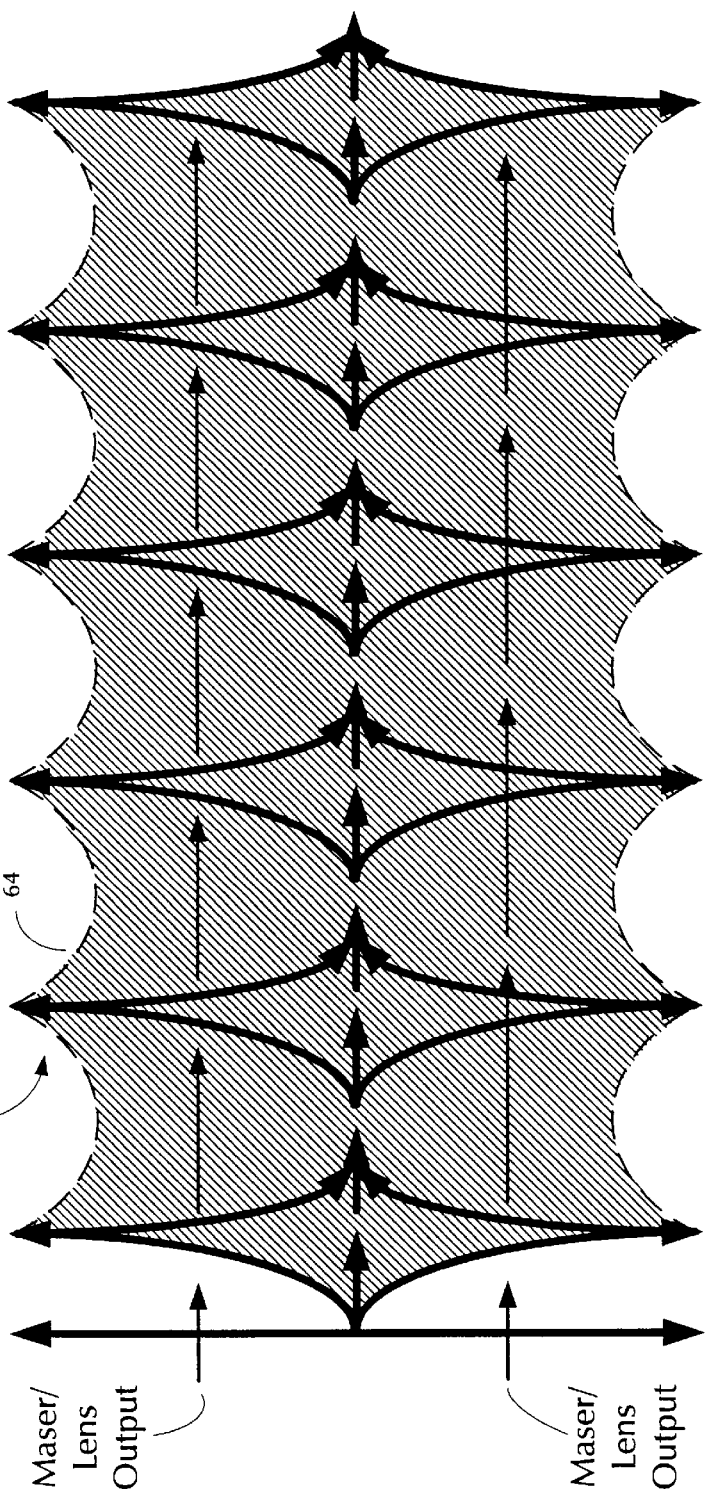
FIG. 9 is a graphical illustration, similar to FIG. 7, illustrating the flux envelope in which the controlled MASER output is transmitted in the system of FIG. 1.
Figure 2:
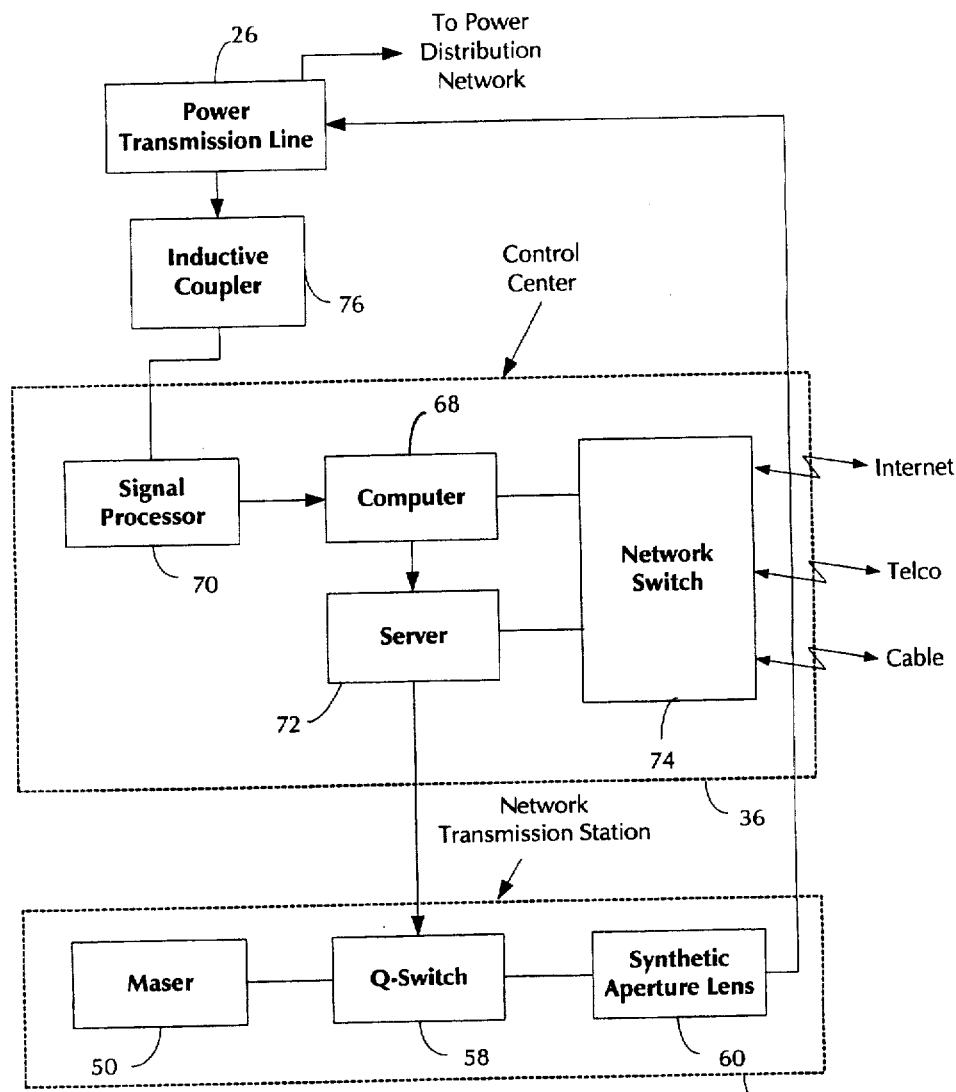

Referring now to FIGS. 5–9, the magnetic field in which the information is transmitted in the system and method of the present invention is graphically illustrated. FIG. 5 shows a typical ideal magnetic frame caused by the rise and fall of the current in the electrical signals being transmitted over the power transmission lines, with the magnetic flux strength increasing and decreasing as the AC voltage, in the example, rises and falls between 0 and 110 volts (normal house voltage). FIG. 6 illustrates a typical series of ideal magnetic frames 66, with a magnetic frame being defined as peak to peak, for a half cycle of the AC signal, illustrating the positive half cycle although it is the same only inverted for the negative half cycle. FIG. 7 illustrates a typical series of ideal magnetic frames for a full cycle of the AC signal. FIG. 8 interrelates the AC signal and the series of ideal magnetic frames for a 60 Hz full cycle AC signal, but only shows the positive portion of the ideal magnetic frames. Lastly, FIG. 9 illustrates a series of magnetic frames for the full cycle of the AC signal and shows in dotted lines a representation of the actual magnetic flux which does not decay to zero and provides a magnetic flux envelope 64 through which the pumped output of the MASER 50 travels after the synthetic aperture lens 60 focuses the output on the magnetic field surrounding the power transmission line 26. The power transmission line 26 then acts as a magnetic waveguide for the coherent acoustic type signal output of the MASER 50. Preferably, the amplitude of the resultant carrier is 10% less than that of the normal electromagnetic wave carried by the power transmission line and thus there is no excessive radiation beyond that associated with the normal transmission of electric power over the distribution network.

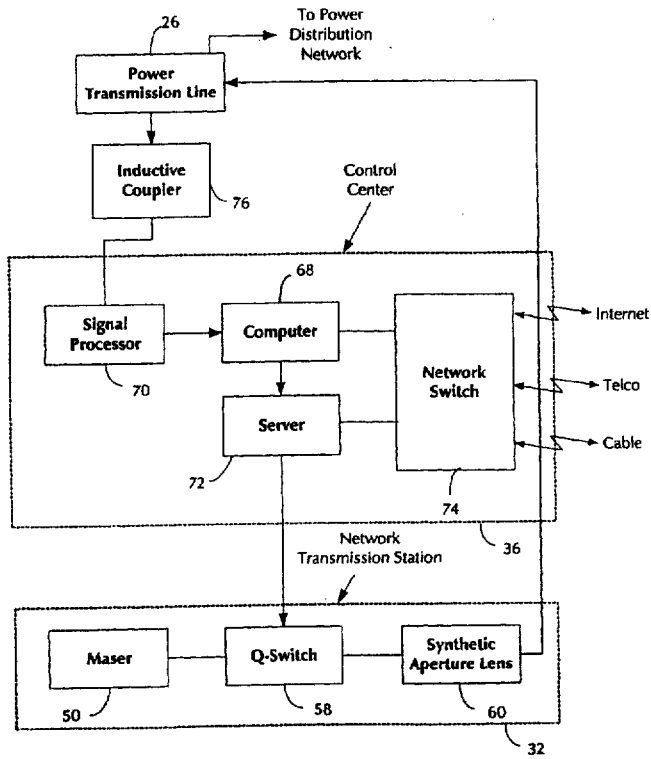

What is claimed is:

1. A method for communicating information between subscribers over power transmission lines, said power transmission lines conveying electrical power to a plurality of diverse electrical sites for providing electrical power to electrical devices disposed at said diverse electrical sites, said subscribers being disposed at said electrical sites, said electrical power being conveyed over said power transmission lines in the form of electromagnetic radiation along said power transmission lines, said electromagnetic radiation having an electric field component and an associated magnetic field component, said method comprising the step of transmitting said information in said magnetic field component of said electromagnetic radiation for enabling communication between said subscribers at said electrical sites.

2. A method in accordance with claim 1 wherein said transmitting comprises the step of transmitting said information in the form of a coherent acoustic type signal in said magnetic field component.

3. A method in accordance with claim 2 wherein said information transmitting step further comprises the step of providing said coherent acoustic signal from a MASER.

4. A method in accordance with claim 1 wherein said magnetic field component defines a magnetic flux envelope along said power transmission line, said information being transmitted within said magnetic flux envelope.

5. A method in accordance with claim 4 wherein said transmitting step comprises the step of transmitting said information in the form of a coherent acoustic type signal within said magnetic flux envelope.

6. A method in accordance with claim 5 wherein said information transmitting step further comprises the step of providing said coherent acoustic signal from a MASER.

7. A method in accordance with claim 5 wherein said information transmitting step further comprises the step of transmitting said information within said magnetic flux envelope from a MASER.

8. A method in accordance with claim 1 wherein said information transmitting step further comprises the step of transmitting said information in said magnetic field component from a MASER.

9. A method in accordance with claim 1 wherein said electromagnetic radiation along said power transmission line comprises an atomic population, said information transmitting step further comprising the step of providing an inverted atomic population along said power transmission line by pumping magnetic energy directly into the atomic population of said electromagnetic radiation for producing an acoustic wave oscillation in said magnetic component at an associated atomic transition frequency.

10. A method in accordance with claim 9 wherein said magnetic energy pumping step comprises the step of pumping said magnetic energy from a MASER.

11. A method in accordance with claim 10 wherein said magnetic field component defines a magnetic flux envelope along said power transmission line, said information being transmitted within said magnetic flux envelope.

12. A method in accordance with claim 9 wherein said magnetic field component defines a magnetic flux envelope along said power transmission line, said information being transmitted within said magnetic flux envelope.

13. A method in accordance with claim 2 wherein said power transmission line comprises a magnetic waveguide for said coherent acoustic type signal.

14. A method in accordance with claim 8 wherein said power transmission line comprises a magnetic waveguide for said transmitted MASER output.

15. A method in accordance with claim 8 wherein said magnetic field component comprises a magnetic field of continua around said power transmission line, said transmitting step further comprises the step of transmitting said information from said MASER at an output frequency sufficient to cause an atomic transition from $E_1$ to $E_2$ within said magnetic field of continua at a specific magnetic moment associated with said electromagnetic radiation along said power transmission line.

16. A method in accordance with claim 1 further comprising the step of controlling said information transmission along said power transmission line.

17. A method in accordance with claim 16 wherein said controlling step comprises the step of controlling said information transmission with a Q-switch.

18. A method in accordance with claim 1 further comprising the step of selectively receiving said transmitted information at a designated subscriber for enabling communication between designated subscribers over said power transmission line.

19. A method in accordance with claim 18 further comprising the step of varying the designated subscriber to receive said transmitted information for enabling communication between different designated subscribers over said power transmission line.

20. A method in accordance with claim 19 wherein said receiving step comprises the step of inductively coupling said transmitted information from said power transmission line for enabling said designated subscriber to selectively receive said transmitted information.

21. A method in accordance with claim 18 wherein said receiving step comprises the step of inductively coupling said transmitted information from said power transmission line for enabling said designated subscriber to selectively receive said transmitted information.

22. A method in accordance with claim 1 wherein said information comprises voice information.

23. A method in accordance with claim 22 wherein said subscribers are telephone subscribers and said voice information comprises telephone voice information.

24. A system for communicating information between subscribers over power transmission lines, said power transmission lines conveying electrical power to a plurality of diverse electrical sites for providing electrical power to electrical devices disposed at said diverse electrical sites, said subscribers being disposed at said electrical sites, said electrical power being conveyed over said power transmission lines in the form of electromagnetic radiation along said power transmission lines, said electromagnetic radiation having an electric field component and an associated magnetic field component, said system comprising means for transmitting said information in said magnetic field component of said electromagnetic radiation for enabling communication between said subscribers at said electrical sites; and means for selectively receiving said transmitted information from said magnetic field component and providing said transmitted information to at least one designated subscriber for enabling said information communication between said subscribers.

25. A system in accordance with claim 24 wherein said transmitting means comprises means for transmitting said information in the form of a coherent acoustic type signal in said magnetic field component.

26. A system in accordance with claim 25 wherein said information transmitting means further comprises a MASER.

27. A system in accordance with claim 24 wherein said magnetic field component defines a magnetic flux envelope along said power transmission line, said information transmitting means further comprising means for transmitting said information within said magnetic flux envelope.

28. A system in accordance with claim 27 wherein said transmitting means comprises means for transmitting said information in the form of a coherent acoustic type signal within said magnetic flux envelope.

29. A system in accordance with claim 28 wherein said information transmitting means further comprises a MASER.

30. A system in accordance with claim 24 wherein said information transmitting means further comprises the a MASER.

31. A system in accordance with claim 24 wherein said electromagnetic radiation along said power transmission line comprises an atomic population, said information transmitting means further comprising means for providing an inverted atomic population along said power transmission line by pumping magnetic energy directly into the atomic population of said electromagnetic radiation for producing an acoustic wave oscillation in said magnetic component at an associated atomic transition frequency.

32. A system in accordance with claim 31 wherein said magnetic energy pumping means comprises a MASER.

33. A system in accordance with claim 32 wherein said magnetic field component defines a magnetic flux envelope along said power transmission line, said transmitting means comprising means for transmitting said information within said magnetic flux envelope.

34. A system in accordance with claim 31 wherein said magnetic field component defines a magnetic flux envelope along said power transmission line, said transmitting means comprising means for transmitting said information within said magnetic flux envelope.

35. A system in accordance with claim 25 wherein said power transmission line comprises a magnetic waveguide for said coherent acoustic type signal.

36. A system in accordance with claim 30 wherein said power transmission line comprises a magnetic waveguide for said transmitted MASER output.

37. A system in accordance with claim 29 wherein said magnetic field component comprises a magnetic field of continua around said power transmission line, said transmitting means further comprises means for transmitting said information from said MASER at an output frequency sufficient to cause an atomic transition from $E_1$ to $E_2$ within said magnetic field of continua at a specific magnetic moment associated with said electromagnetic radiation along said power transmission line.

38. A system in accordance with claim 24 further comprising means for controlling said information transmission along said power transmission line.

39. A system in accordance with claim 38 wherein said controlling means comprises means for controlling said information transmission with a Q-switch.

40. A system in accordance with claim 24 wherein said controlling means comprises synthetic aperture lens means.

41. A system in accordance with claim 40 wherein said controlling means further comprises Q-switch means operatively associated with said synthetic aperture lens means.

42. A system in accordance with claim 24 further comprising means for varying the designated subscriber to receive said transmitted information for enabling communication between different designated subscribers over said power transmission line.

43. A system in accordance with claim 42 wherein said receiving means comprises means for inductively coupling said transmitted information from said power transmission line for enabling said designated subscriber to selectively receive said transmitted information.

44. A system in accordance with claim 24 wherein said receiving means comprises means for inductively coupling said transmitted information from said power transmission line for enabling said designated subscriber to selectively receive said transmitted information.

45. A system in accordance with claim 24 wherein said information comprises voice information.

46. A system in accordance with claim 45 wherein said designated subscribers are telephone subscribers and said voice information comprises telephone voice information.

* * * * *

UNITED STATES PATENT AND TRADEMARK OFFICE
CERTIFICATE OF CORRECTION

Page 1 of 3

PATENT NO. : 5,982,276
DATED : November 9, 1999
INVENTOR(S) : Stewart

It is certified that error appears in the above-identified patent and that said Letters Patent is hereby corrected as shown below:

The title page, showing an illustrative figure, should be deleted and substitute therefor the attached title page.

Delete drawing Sheet 2 of 9 and substitute therefor the Drawing Sheet, consisting of Fig. 2, as shown on the attached page.

Signed and Sealed this

Twenty-seventh Day of March, 2001

*Attest:*

NICHOLAS P. GODICI

*Attesting Officer*

*Acting Director of the United States Patent and Trademark Office*

United States Patent [19]

Stewart

[11] Patent Number: 5,982,276
[45] Date of Patent: Nov. 9, 1999

[54] MAGNETIC FIELD BASED POWER TRANSMISSION LINE COMMUNICATION METHOD AND SYSTEM

[75] Inventor: William L. Stewart, Dallas, Tex.

[73] Assignee: Media Fusion Corp., Dallas, Tex.

[21] Appl. No.: 09/074,107

[22] Filed: May 7, 1998

[51] Int. Cl.$^6$ .................................................. H04M 11/04
[52] U.S. Cl. ........................... 340/310.01; 340/310.03; 340/310.07; 455/402
[58] Field of Search ....................... 340/310.01, 310.03, 340/310.07; 333/17.1, 124; 455/402, 41

[56] References Cited

U.S. PATENT DOCUMENTS

| | | | |
|---|---|---|---|
| 4,471,399 | 9/1984 | Udren | 340/310.01 |
| 5,554,968 | 9/1996 | Lee | 340/310.01 |
| 5,559,377 | 9/1996 | Abraham | 307/104 |
| 5,670,931 | 9/1997 | Besser et al. | 340/310.01 |
| 5,684,450 | 11/1997 | Brown | 340/310.02 |
| 5,886,619 | 3/1999 | Takasan et al. | 340/310.01 |

*Primary Examiner*—Daniel J. Wu
*Attorney, Agent, or Firm*—Bryan Cave LLP

[57] ABSTRACT

A method and system for communicating information between subscribers over power transmission lines which normally convey electrical power to a plurality of diverse electrical sites for providing electrical power to electrical devices disposed at these diverse electrical sites. The subscribers on the communication network are located at these electrical sites. The electrical power conveyed over the power transmission lines is in the form of electromagnetic radiation which has an electrical field component and an associated magnetic field component. The information, such as telephonic voice communication or other data, is transmitted in the magnetic field component of the electromagnetic radiation carried over the power transmission line, such as by exciting the field with a MASER, in order to enable communication between the subscribers at the various electrical sites. The MASER provides an inverted atomic population by pumping directly, through a Q-switch and a synthetic aperture lens, into the atomic population of the electromagnetic wave carried over the power transmission line to produce acoustic wave oscillation at the appropriate atomic transition frequency. The MASER output is transmitted within the existing magnetic flux envelope created by the magnetic field of the electromagnetic radiation carried over the power transmission line and the power transmission line acts as a magnetic waveguide for the coherent magnetic frame emissions from the MASER. Inductive coupling is used to receive the transmitted information.

46 Claims, 9 Drawing Sheets